July 14, 1931.  H. O. LOWN  1,814,003
GANG PLOW
Filed March 10, 1930   2 Sheets-Sheet 1
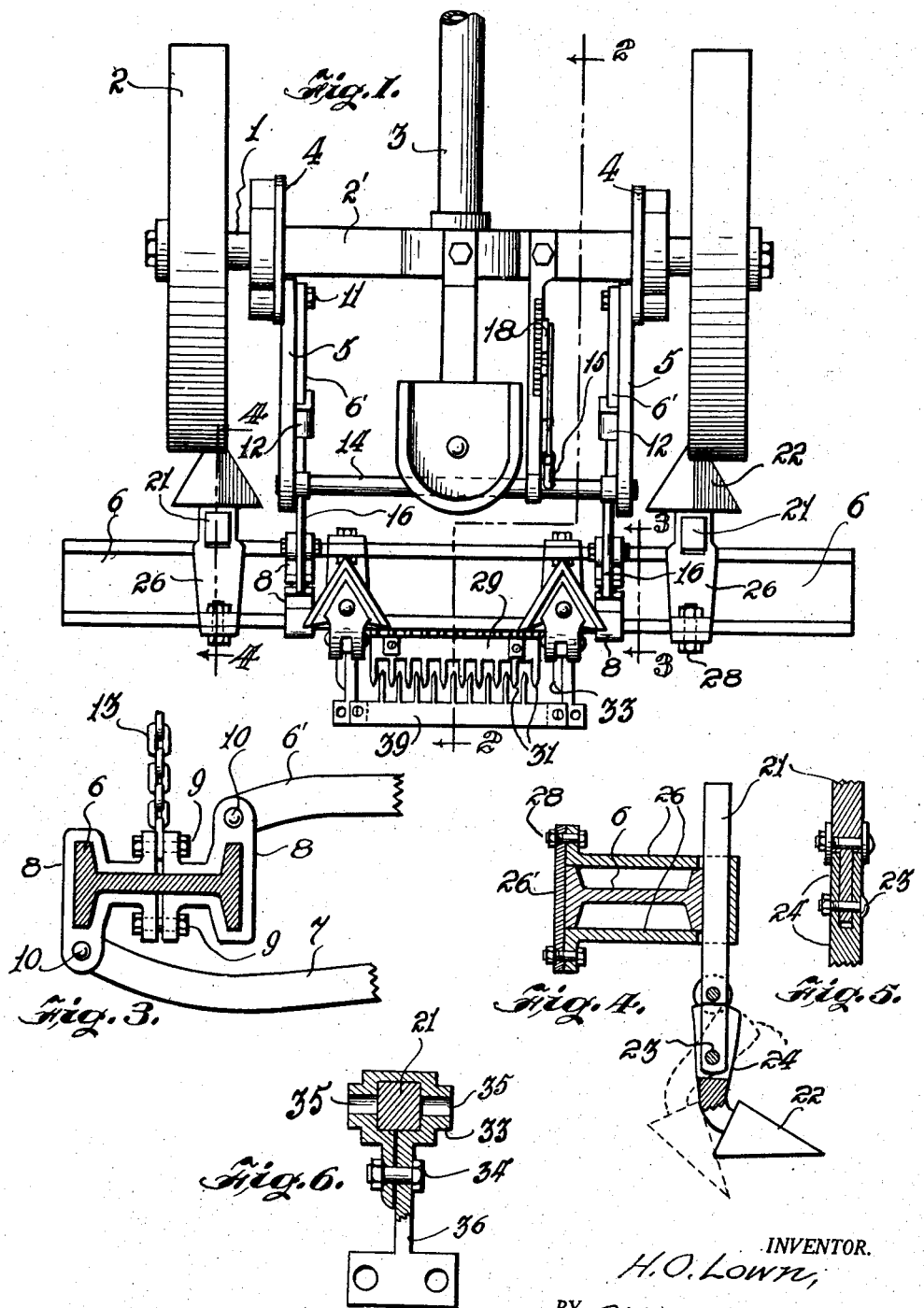
INVENTOR.
H. O. Lown,
BY John M. Spellman
ATTORNEY.

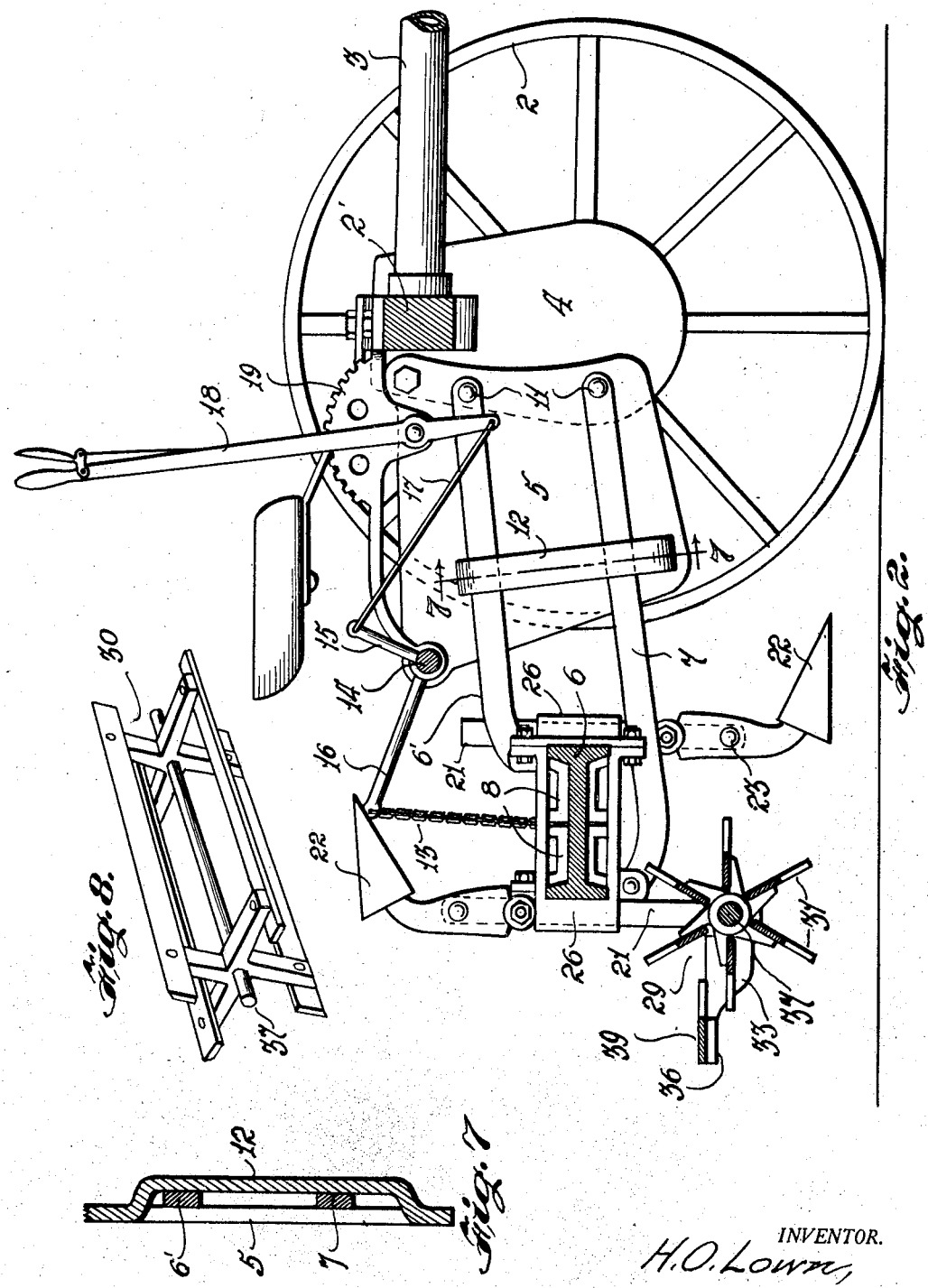

Patented July 14, 1931

1,814,003

UNITED STATES PATENT OFFICE

HARRY O. LOWN, OF SAN ANGELO, TEXAS

GANG PLOW

Application filed March 10, 1930. Serial No. 434,557.

The primary object of my invention is to provide an improved gang plow which is well adapted to breaking the soil and to provide in the construction thereof means for giving the plow exceptional strength to prevent twisting, bending or breaking of the plow and parts.

Another object of my invention is to provide a gang plow with an arrangement whereby each plow can be adjusted individually on a horizontal plane and including means for adjustment of the gang of plows vertically.

A further object of the invention is to provide means whereby the plows will automatically follow the rise and fall of the soil where it is hilly to adapt the plows to the proper incline for travel through the soil.

My invention also includes a novel means for attaching to the plow frame a soil treating implement or implements with means for maintaining said implements in a clean condition at all times during the operation of such implements.

Finally my invention includes in addition to the above objects, means for attaching a stalk cutter to the plow frame in units.

With the above and other objects in view, my invention will be better and more thoroughly understood from a perusal of the following detailed description, taken in connection with the accompanying drawings, and wherein:

Figure 1 is a top plan view of my invention, the front portion being broken away.

Figure 2 is a longitudinal sectional view of the plow the view being taken on the line 2—2 of Figure 1.

Figure 3 is a cross-sectional view through the beam which supports the plows and parts, the view being taken on the line 3—3 of Figure 1.

Figure 4 is also a cross-sectional view along the line 4—4 of Figure 1.

Figure 5 is a sectional detail view, showing the means for connecting the plow to its standard in a pivotal manner.

Figure 6 is a detail sectional view showing means for attaching and supporting a scratcher, stalk cutter and a cleaning means for the scratcher.

Figure 7 is a sectional detail view along the line 7—7 of Figure 2, and

Figure 8 is a perspective view of the stalk cutter by itself.

Referring more in detail to the drawings, 1 indicates an axle supported by the wheels 2, and 3 is a beam which connects the front portion of the machine to the rear axle, the forward portion of the machine being of conventional construction and not included in the invention.

The axle is of the arcuate type, having a bowed portion 2' and side plates 4, and bolted to the plates 4 are plates 5. To the rear of the plates 5 is an I beam indicated at 6, beam 6 being provided for the support of the plows and other parts hereinafter described. The beam 6, however, may be of any shape and need not necessarily be of this construction. A connection is established between the beam 6 and the plates 5 by means of the arms 6' and 7 in connection with the members 8, which are connected by the bolts 9 and embrace the I beam 6. These arms 6' and 7 are pivoted to the members 8 as shown at 10 and likewise connected to the plates 5 at 11, the plates being held in alinement with the arms by means of the member 12 which is formed integrally with the plates 5 or may form a separate part if desired. The purpose of this arrangement is to permit the arms carrying the beam to play against the plates 5 so that the beam 6 may be tilted slightly when the plows strike uneven surfaces of the soil, this action being automatic. The beam 6 may also be lifted or lowered as the case may require by means of a chain or similar member 13, in connection with the cross rod 14, small arm 15, and the links 16 and 17. The rod 14 is journaled in the plates 5 and the link 17 has one end connected to the lever 18, the lever being pivoted to the segment 19. In this manner it will be obvious that the beam will be allowed to tilt to whatever direction is necessary so that the plows may follow the surface of the soil.

In Figures 4 and 5 is shown the manner of connecting the plows to the beam 6. For this purpose there is provided a plow standard or rod 21, preferably of square formation, the plow foot 22 being pivoted thereto as indicated at 23 by the shank 24 of the plow foot. The broken-line formation in Figure 4 shows the tilted position of the plow foot. The rod 21 is passed through the slots in one end of the member 26 which embraces the I beam and is held onto the beam by a plate 26' by bolts 28. It will be obvious that the members 26, each carrying a plow, may be shifted along the beam to desired position, after which the bolts 28 are tightened. Also that the plows may be placed on either side of the beam and as close together as desired to provide for as many plow feet as necessary. In this means of connecting the plow feet to the beam additional strength is obtained, as the plow feet are suspended almost directly from the beam and there are no rear or forward extensions spaced from the beam to carry the plow feet as is sometimes the case. The long I beam and the plow parts are thus practically one and are very strong.

My invention also includes means for the utilization of a scratcher such as is indicated at 29, Figure 2, and the use also of a stalk cutter as shown in Figure 8 at 30. The scratcher is preferably constructed in units or sections, one section or unit being shown in operative position in Figure 1. This scratcher has sharpened teeth 31 which scratch or lightly break the crust of the soil in the cultivation of the latter. Novel means are employed for attaching both the stalk cutter or the scratcher, both of which are connected to the machine in sections or units, as shown in Figure 1. When these units are to be attached, two of the plow feet and corresponding rods 21 are inverted in the members 26, as shown in Figure 2. Then to the lower ends of the rods 21 there are placed sleeves 33, with bolts 34 for tightening the sleeves in position. Slots 35 form bearings for the ends of the axle 37 both of the stalk cutter or the scratcher, the bearings being on both sides of the sleeve so that several of the scratchers or stalk cutters may be placed on together or only one used as preferred. A prolongation 36 of the sleeve provides a support for a toothed bar or comb 39 for the purpose of maintaining the scratcher teeth clean of soil as the scratcher rotates.

From the foregoing it will now be apparent that the plow provides excellent means for breaking the soil, being very strong with the possibility of twisting, bending or breaking the plows and parts reduced to a minimum. It is obvious of course that ordinary cultivator shovels may be carried on the beam instead of the regular plow feet if preferred. The operator can very easily lift and lower the beam by means of the lever 18 and adjust the plows to desired height from the soil, while the beam is allowed to tilt by means of the pivoted arms to provide for unevenesss of the ground in maintaining the plow points in proper angular relation thereto. Where a gang of plows alone are used, the sleeves 33 which form bearings for the scratcher or the stalk cutter are of course removed.

It is obvious that my invention may be modified to some extent in keeping with the principle thereof, such modifications to be within the scope and meaning of the appended claims.

What is claimed as new is:

1. A plow of the character described consisting of a wheeled framework and having an I beam suspended in transverse relation to the framework; means for pivoting said I beam to the framework to allow the I beam to oscillate on uneven ground, a plurality of plows mounted on the I beam, each plow having an individual slidable connection to the I beam horizontally and vertically of the beam; means for inverting the plows on the I beam and means for attaching a stalk cutter to the inverted plow shanks in units.

2. A plow of the character described comprising a wheeled framework having an I beam suspended in transverse relation to and of the rear of the framework; members embracing the I beam and having a slot in one end for reception of a shank of a plow; means for pivoting said I beam to the framework, said means consisting of members attached to the I beam and to the framework to permit the beam to rock when the plows strike uneven ground and automatically adjusting the plows to varying soil surfaces; lever means for raising and lowering the I beam to initially adjust the plows to the soil; and sleeve members with prolongations and shaft bearings for the purpose of inverting the plow shanks in proper spaced relation on the beam for connection of a stalk cutter or a soil scratcher; the shafts of the cutter and scratcher being supported in said bearings with a cleaner for the scratcher attached to said prolongation.

In testimony whereof I affix my signature.

HARRY O. LOWN.